Nov. 26, 1963 A. H. DICKINSON 3,112,152

METHOD AND APPARATUS FOR PHOTOGRAPHICALLY RECORDING NUMERICAL VALUES

Filed April 16, 1954 8 Sheets-Sheet 1

Nov. 26, 1963 A. H. DICKINSON 3,112,152

METHOD AND APPARATUS FOR PHOTOGRAPHICALLY RECORDING NUMERICAL VALUES

Filed April 16, 1954 8 Sheets-Sheet 2

INVENTOR.
Arthur H. Dickinson
BY
Pennie, Edmonds, Morton, Barrows & Taylor

INVENTOR.
Arthur H. Dickinson
BY
Pennie, Edmonds, Morton, Barrows & Taylor

INVENTOR.
Arthur H. Dickinson
BY
Pennie, Edmonds, Morton,
Barrows & Taylor

Nov. 26, 1963 A. H. DICKINSON 3,112,152

METHOD AND APPARATUS FOR PHOTOGRAPHICALLY RECORDING NUMERICAL VALUES

Filed April 16, 1954 8 Sheets-Sheet 8

INVENTOR.
Arthur H. Dickinson
BY
Pennie, Edmonds, Morton, Barrows & Taylor

United States Patent Office 3,112,152
Patented Nov. 26, 1963

3,112,152
METHOD AND APPARATUS FOR PHOTOGRAPHICALLY RECORDING NUMERICAL VALUES

Arthur H. Dickinson, Greenwich, Conn., assignor to International Business Machines Corporation, New York, N.Y., a corporation of New York Filed Apr. 16, 1954, Ser. No. 423,817
3 Claims. (Cl. 346—110)

This application relates to methods and apparatus for producing on a photographic film a series of images of different characteristics and so related as to be used for recording different digital values. In the application of Arthur H. Dickinson, filed concurrently herewith, now Patent No. 2,936,112, there is disclosed a method and apparatus for utilizing the varying responses of a photoelectric cell to differences in the rate of increasing intensity of the light activating the cell for controlling the electronic responses in electronic computing machines and like apparatus, and this application is directed to a method of making film records for such use.

More specifically, the method consists in producing on the face of a cathode ray tube, for photographic purposes, characters which represent digits. The different numerical values are represented by the differences in the slope of one side of the characters. Location of the character on the face of the tube determines the numerical order of the recorded value.

In general, the sequence of steps to record the first digit, after establishing circuits corresponding to the number to be recorded by depressing the keys of a suitable keyboard, are: producing an illuminated spot on the face of the cathode ray tube at the location selected to represent the units order; causing the spot to shift horizontally and vertically to trace an illuminated pattern on the tube; controlling the amplitude of the horizontal movements of the spot from the circuit of the depressed key in the unit's column to give one side of the illuminated area a predetermined slope. At the completion of the tracing of the first image the beam is shifted to produce the spot in the position required for the "tens" order and through the control of the circuit of the depressed key in the "tens" column the horizontal shift of the spot is controlled to give to the area traced on the cathode ray tube the configuration representative of the digit of the depressed key in the "tens" column. This operation repeats itself for each column in which a key is depressed. The cathode ray tube is enclosed in a light excluding cover and positioned at the end of the cover is a record-camera having an intermittent film feed to advance the film a distance corresponding to the vertical dimension of the row of images recorded in the film plus the desired distance between the recorded images. The camera is focused on the face of the cathode ray tube and the camera shutter is open during the tracing of the images on the tube so that the tracing of the images and the exposure of the film proceed simultaneously.

At the conclusion of the recording of successive images corresponding to all the depressed keys the film feed is actuated to advance the film one step, the depressed keys are released and the apparatus is ready to record another row of digits.

In the accompanying drawings I have shown the apparatus required for recording numerical values of three orders but it will be understood that the apparatus disclosed may be duplicated to any extent desired, depending on the size of the cathode ray tube and the width of the film.

Referring to the drawings.

Figure 1A:
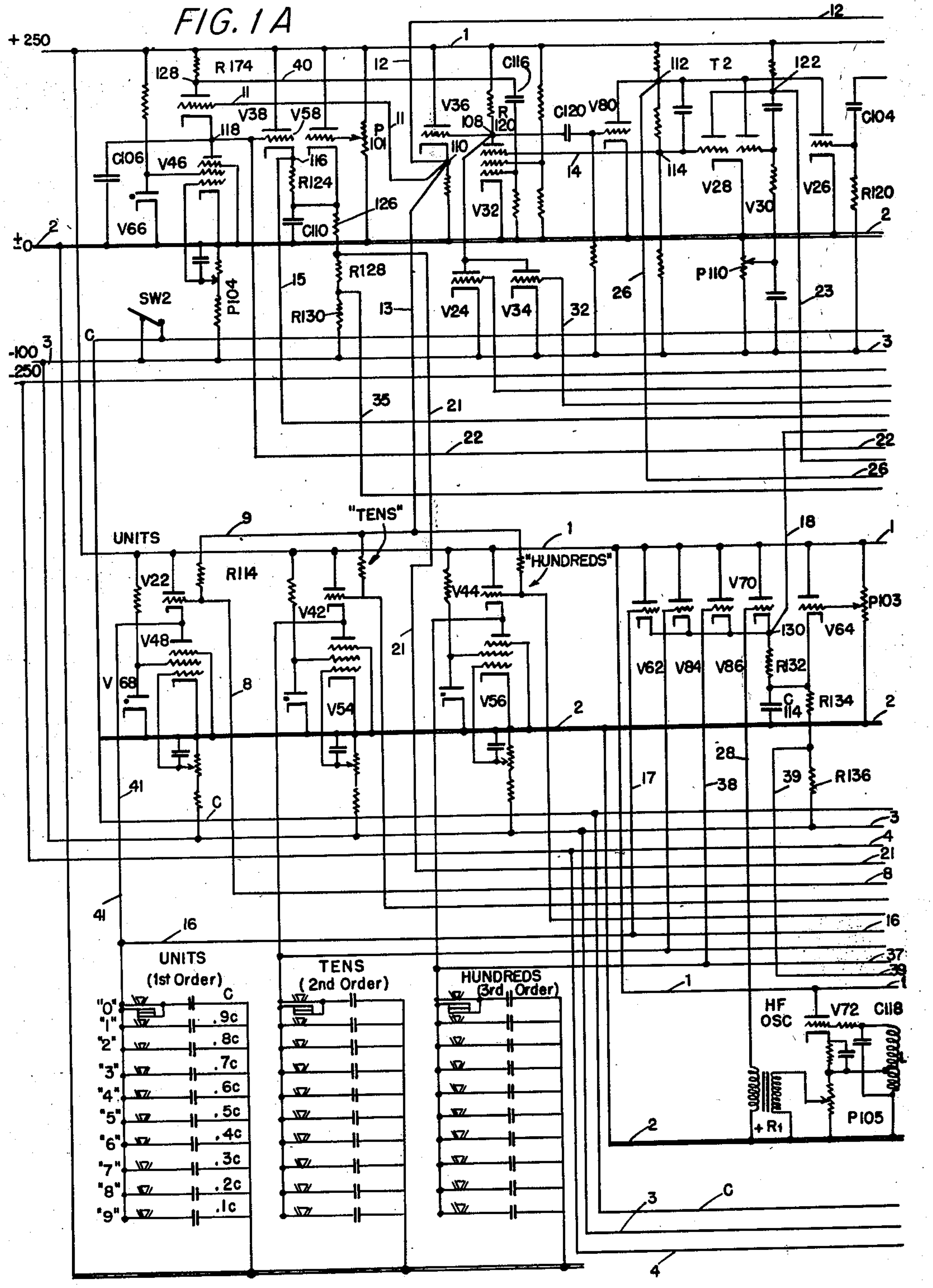
FIGS. 1A–1C are wiring diagrams of the mechanism with the keyboard, cathode ray tube and other instrumentalities, except the film feed, indicated diagrammatically.
Figure 1B:
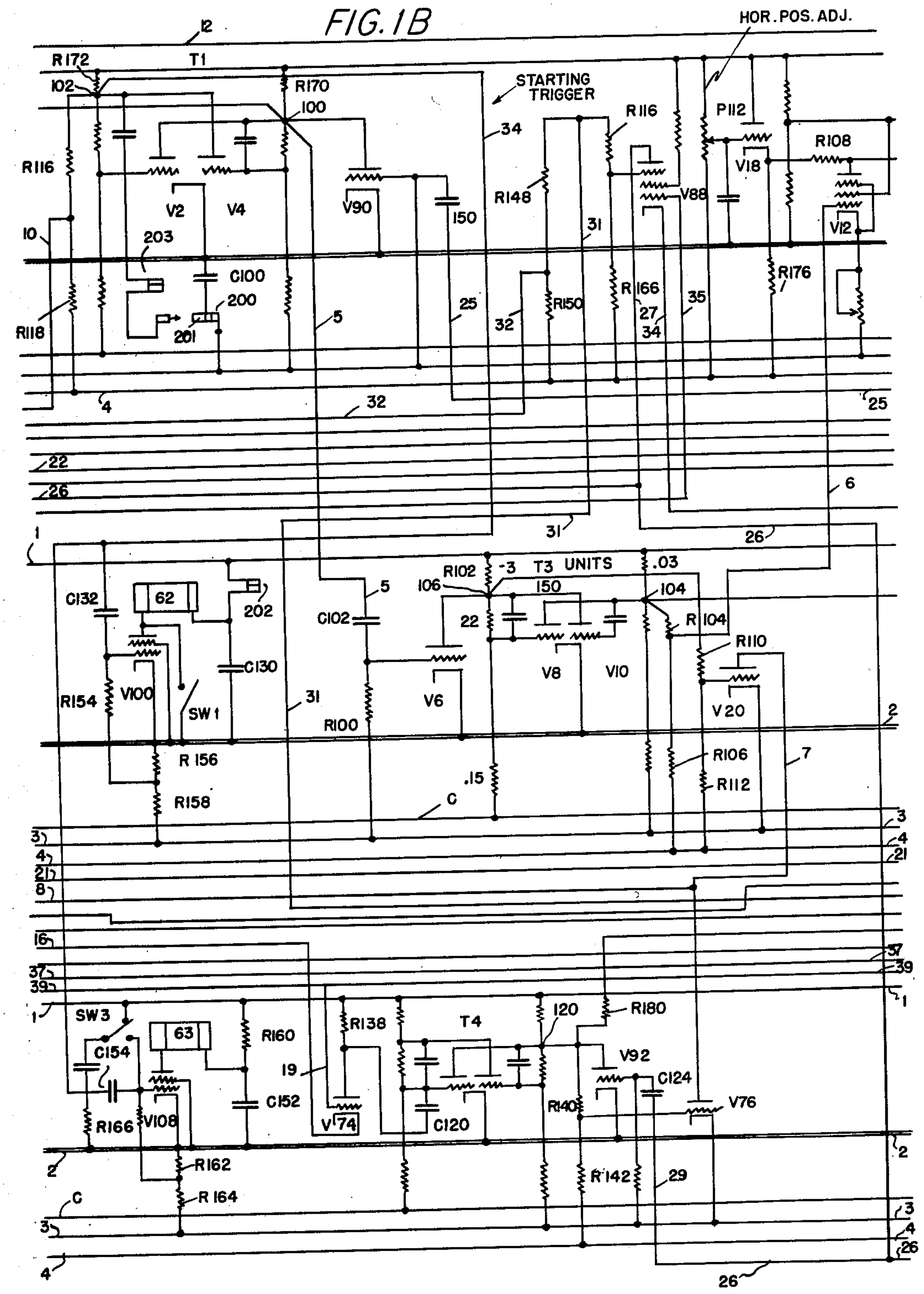
Figure 1C:
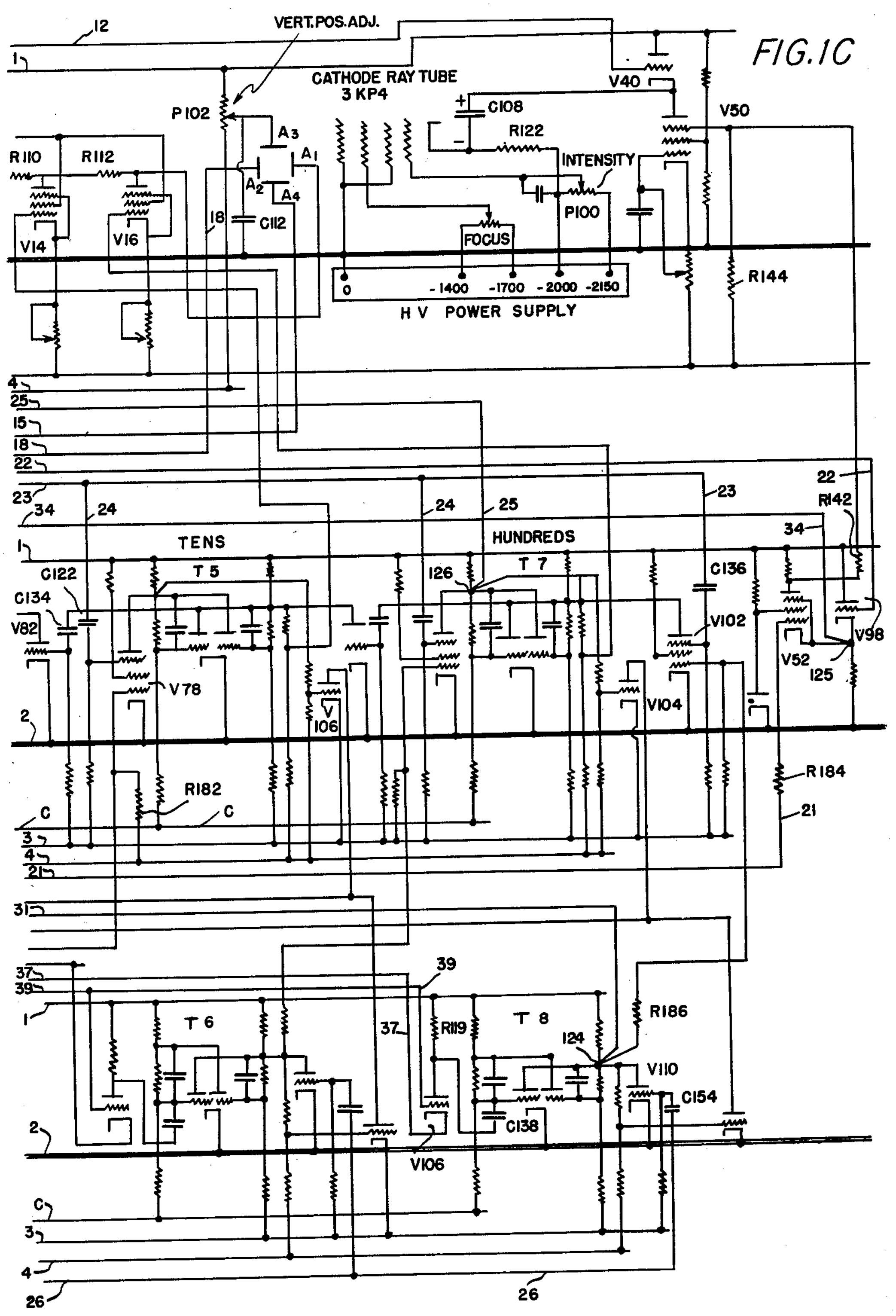

A preferred method of carrying out the required operations will be described in connection with the diagrams FIGS. 1A–1C. In FIGS. 1A–1C, the condensers are designated by numerals following the letter C; the resistors reference numerals are prefaced by R; the triodes, pentodes and thyratrons by V; the trigger assemblies by T, and the potentiometers by P. The keys for three orders are illustrated in the circuit diagram. The individual key circuits which are closed when the keys are depressed included condensers designated in the units column C to .1C respectively, which differ in capacity from each other in the order indicated, that is to say the condenser in the circuit of the "one" key has a capacity nine-tenths that of the "zero" key condenser and so on down to the "nine" key whose condenser has a capacity of one-tenth that of the "zero" key condenser.

Before the keys indicating the first number to be recorded are depressed, D.C. current of the indicated voltages is supplied to the lines 1, 3 and 4 of the control circuit and to the terminals of cathode ray tube. Heating current from a source not shown, is also supplied to the vacuum tubes. Also at this point a switch SW2 in the branch of line 3 which leads to several triggers is momentarily opened so these triggers will be "off."

The proper keys to close the circuits of the several digits making up the first number to be recorded are then depressed. If this number be for example "741," the circuit through the unit column of the keyboard will include condenser .9C. The keyboard is equipped with the usual "motor bar" for initiating the recording cycle after the selected keys are depressed and with latching mechanism for holding down the depressed keys until the recording cycle is completed. Also as is common in keyboards of this type the circuit of the "zero" key is normally closed by a switch 204 which is opened when any other key is depressed so that if no key is depressed the "zero" will be recorded. A keyboard such as employed for controlling the conventional card punching machine may be used without mechanical alteration and is therefore not illustrated save in the circuit diagrams.

Upon depressing the "motor bar" of the keyboard contacts 200 open and contacts 201 close. These contacts are shown in FIG. 1 as part of the assembly constituting starting trigger T'. Contacts 203 which are also shown here are in the camera and are closed as long as a supply of unexposed film exists in the camera. A condenser C100, charged through the normally closed contacts 200, is now discharged through contacts 201, 203 into the grid circuit of triode V2 of the T' trigger assembly which trigger is thereby switched for "off" to "on" status. The motor bar is latched in the depressed position by a latch lever and is maintained so until the completion of the recording cycle. When T1 switches on its V2 triode, connected to line 1, through resistor R170, becomes non-conductive. Its V4 triode, connected to line 1 through R172 becomes conductive. The reduction of current flow through R170 causes point 100 to rise in potential, likewise, the increased current flow through resistor R172 causes point 102 to decrease in potential. Point 100 is connected by wire 5 through condenser C102 to the grid of triode V6 of trigger T3 (see FIG. 1B). The grid of V6 is connected through resistor R100 to line 3 and this tube is normally at cut-off. The positive pulse applied from point 100 is of sufficient amplitude to cause conduction of V6. The V6 plate is connected to line 1 through resistor R102. The increased current flow through resistor R102 causes trigger T3 to switch from off to on status. T3 is the first trigger in a three stage commutator comprised of triggers T3, T5 and T7. T3 is on during the tracing of the image representing the digit selected in the units order. T5 is on during the tracing of the image representing the digit selected while the "tens" order digit is traced and T7 is on during the tracing of the "hundreds" order digit.

With T3 now switched on, its point 104 is at the highest of two possible potentials. A voltage divider R104, R106 is connected between point 104 and line 4 and the junction of R104, R106 is connected via wire 6 to the No. 1 grid of pentode V12. With its grid now at its highest potential V12 is conducting and its current flow determines the initial position of the beam horizontally for recording the units digit. A more detailed operation of this circuit will be given later.

When T3 switched on its point 106 decreased in potential. A voltage divider R110, R112 is connected from point 106 to line 4. Thus with T3 on, the grid of triode V20, connected to the R110, R112 junction, is at its lowest of two possible potentials and V20 is non-conductive. With V20 non-conductive, the horizontal sweep voltage generator for the units order is now unblocked.

Point 102 of starting trigger T' is connected through voltage divider R116, R118 to line 4. When trigger T' is switched "on," point 102 decreases in potential so that the junction of R116, R118 is at the lower of its two potentials. This junction is connected via wire 10 to the grid of triode V24 and V24 is at this time non-conductive. A similar triode V34 is already non-conductive under control of a circuit to be explained later.

Point 100 of starting trigger T' is connected through condenser C104 to the grid of triode V26 which is normally non-conductive. The grid of triode V26 thus receives a positive pulse when trigger T' is switched "on" and V26 becomes conductive. A self restoring trigger, designated T2, is turned on through V26. T2 turns off at a time determined by the trigger components. When T2 switches on its point 114 is at the lower of two potentials. Point 114 is connected via wire 14 to the suppressor grid of pentode V32. V32 is thus held at cutoff during the time trigger T2 is on. With V34 at cutoff and the simultaneous cutting off at V24 and V32, point 108 rises sharply from a potential below that of line 2 (due to conduction of V24) to a potential near that of line 1. V32, V24 and V34 constitute a charge control circuit. This circuit controls the charging of certain condensers. The subsequent linear discharge of these condensers controls the horizontal and vertical deflection potentials as well as a beam intensity control.

As a result of motor bar depression, except for delays caused by trigger action (in the order of 2 or 3 microseconds) all of the above described operations occurred simultaneously. At this point the time delay provided by trigger T2 prolongs the charging period for the condensers and eliminates possible misoperations caused by delays in trigger switching, beam positioning, etc.

The grid of a cathode follower V36 is connected to point 108. As previously stated point 108 is now at a potential near line 1 as is also point 110.

Point 110 of cathode follower V36 is connected via wire 11 to the grid of triode V38. The cathode of V38, point 118, is connected to the side of condenser C106. The other side of C106 is connected to line 2. The increased current flow through V38 causes charging of C106. As C106 charges the potential across its terminals increases. Eventually current flow through V38 (as a result of C106 charging) ceases. Reduction of current flow through resistance R174 between line 1 and V38 and the resulting positive rise of point 128 is applied via wire 40 through condenser C116 to the No. 1 grid of pentode V32. Since grid No. 3 of V32 is already at cutoff no further action results at this time. Condenser C106 is now fully charged and is maintained so by the action of V38. The action of voltage regulator tubes V66 and V68 and others similarly connected is to maintain constant screen potential in the constant current pentode circuits.

Concurrent with the charging of condenser C106, C108 in the circuit for controlling the intensity of the beam of the cathode ray tube, is charged. Point 110 of cathode follower V36 is connected via wire 12 to the grid of triode V40. The increased current flow through V40 causes the charge across C108 to increase. When C108 is fully charged to the new level of V40 cathode, current flow through V40 is decreased. The beam current of the cathode ray tube is normally cut off by the adjustment of resistance P100, and the cathode of the cathode ray tube is at a positive potential with respect to its No. 1 grid. While condenser C108 is charging, the voltage drop across R122 is such that the cathode ray tube cathode becomes more positive. The beam already being at cutoff, that has no effect. When C108 is allowed to discharge, however, the cathode becomes less positive and the reduced grid bias permits the spot to appear, i.e., beam is turned on. The beam is therefore "on" only during the discharge of condenser C108.

For each order in the keyboard there is a horizontal sweep voltage generator. However, only that circuit released by the commutator is charged during each charging period. As described, trigger T3 of the "units" order is switched to "on" by the action of the motor bar. As a result a triode V20 became non-conductive. The plate of V20 is connected via wire 7, wire 8 through resistor R114, wire 9 and wire 13 to the junction 110, the potential of which at this time is as explained above near that of line 1. As V20 is non-conductive there is no voltage drop across R114 and the grid of triode V22 (connected to R114) assumes the potential of point 110. Triggers T5 and T7 of the "tens" and "hundreds" orders, respectively, are off at this time and their associated triodes V106, V104 corresponding to V20 in the "units" circuit are conductive. The current flow through the resistors corresponding to R114 thus prevents the grids of the tubes corresponding to V22 in the "tens" and "hundreds" circuits from rising above line 2.

With the grid of V22 now near line 1 (junction 110) a charging of the condenser selected in the units column of the keyboard takes place. This condenser is connected from the lin 2 through the key bar contacts then via wire 41 to the cathode of V22. Charging takes place in the same manner and at the same time as the charging of condenser C106 previously described. At this point in the recording cycle condensers C106, C108 and condenser .9C selected by depressing the "1" key in the units order of the keyboard have reached their maximum charge. After a period of time determined by the circuit constants of trigger T2 and adjustment of resistance F110 in the trigger circuit, T2 turns off. Thus the charging interval is terminated and the discharge period begins.

When trigger T2 switches off its point 114 returns to the higher of its two potentials which is near that of line 2. Point 114 is connected via wire 14 to the No. 3 grid of pentode V32. Thus V32 becomes conductive. Point 108 drops sharply to a potential near line 2. A corresponding drop of point 110 thus reduces the positive voltage on the grids of triodes V38, V40 and V22 of the three charging circuits, and the discharging of all charged condensers C106, C108 now begins simultaneously. Since V40 is now at cutoff conduction of V50 reduces the charge on C108. Conduction of V50 causes current flow through resistor R122 in such direction that the cathode of the cathode ray tube becomes less positive with respect to its No. 1 grid. With the grid bias thus reduced the beam is turned on.

The vertical movement of the spot is controlled by the discharge of condenser C106. At the beginning of the discharge period when the spot first appears the charge on C106 is at a maximum and the spot is at a point corresponding to its maximum downward vertical deflection. Condenser C106 is caused to discharge at a linear rate through the conduction of a constant current discharge path, pentode V46. This circuit is similar to those used in many commercial oscilloscopes and is capable of sawtooth waveforms which are extremely linear. The rate of discharge of condenser C106 is determined by the size of the condenser and the current flow in the V46 anode circuit as adjusted by potentiometer F104.

As condenser C106 is discharged a decrease in current flow in cathode follower circuit V58 occurs. The reduction in current in R124 causes point 116 to become less positive. Point 116 is connected via wire 15 to deflecting anode A4 of the cathode ray tube. Thus, as point 116 falls toward the potential of that of line 2 the spot moves upwardly. The potential of point 116 continues to fall toward that of line 2 until cutoff of V58 occurs. At such time point 116 has the same potential as the R124, R126 junction. The potential of this junction is adjustable by potentiometer P101 and determines the extent of vertical movement of the spot. Potentiometer P101 thus affords a vertical size adjustment.

The R124, R126 junction is maintained at a constant potential, as adjusted, through the joint action of condenser C110 and cathode follower V60. Any change in current flow in triode V58 causes a change in grid bias of triode V60 circuit. An opposite change in current is thus produced in the circuit of V60 which compensates for the changing V58 current and maintains the potential of junction R124, R126 constant. Potential changes at this point are also opposed through the action of condenser C110.

A potentiometer P102 is used to adjust the potential of deflecting anode A3 in the cathode ray tube and constitutes a vertical position adjustment.

Concurrent with the discharge of C106 which is causing vertical movement of the spot, discharging of the condenser .9C selected in the units order of the keyboard is also taking place. At the beginning of the discharge period the voltage appearing across the keyboard condenser is applied through the key bar contacts wire 41, wire 16 and wire 17 to the grid of triode V62. The cathode of V62 is connected through resistance R132, R134 and R136 to line 3. The R132, R134 junction is maintained constant by the joint action of condenser C114 and the cathode follower V64. Operation of this circuit is similar to that described for V58, V60 circuit. By adjustment of potentiometer P103 the cutoff point of V62 is adjusted. Said adjustment determines the extent of horizontal sweep and constitutes a "width" control.

As the potential of V62 grid reduces from its maximum value due to the discharging of the keyboard condenser, the voltage drop across R132 reduces and the potential of point 130 falls toward line 2. Horizontal deflecting plate A2 of the cathode ray tube is connected to point 130 via wire 18, thus the potential of A2 also falls. With A2 becoming less positive the spot of light is caused to move horizontally away from anode A2.

A triode V70 also has its cathode connected to point

130. Current flow through this triode also flows through resistor R132, and affects the horizontal deflecting potential. The grid of V70 is connected via wire 28 to an oscillator output transformer TRF1. The voltage appearing at the secondary of this transformer is adjustable by potentiometer P105. The oscillator is of the well known Hartley type and is of relatively high frequency. P105 is so adjusted that when triode V62 is conducting at the beginning of the discharge period triode V70 is on the threshold of its conducting region. As conduction through V62 decreases due to the linear discharge of the keyboard condenser, the cathode of V70 becomes less positive. The positive peaks occurring on the grid of V70 as provided by the high frequency oscillator thus restores point 130 to its initial potential with each such positive peak. During the negative peak of the high frequency oscillator output, V70 is at cutoff and point 130 assumes a potential determined by current flow through V62. Thus, as the voltage drop across R132 decreases from an initially highest point to a minimum of zero, it is constantly being returned to its highest value with each alternation of the high frequency oscillator, the minimum value for each alternation being determined by the instantaneous value of current through triode V62. Potentiometer P112 is a horizontal position control, it is connected between lines 1 and 4 with its arm to the grid at triode V18. Thus, by adjustment of P112 the current through V18 is varied and the voltage drop across resistor R176 is adjusted to properly position the beam horizontally through deflecting anode A1 of the cathode ray tube which is connected to the cathode of V18, resistors R108, R110 and R112. The deflecting potential existing on A1 is determined by the sum of the voltage drops through the series resistors R108, R110 and R112 and the voltage across R176. At this time pentode V12 through "units" trigger T3 is conducting as previously explained and pentodes V14 and V16 similarly connected with "tens" and "hundreds" triggers T5 and T7 are non-conductive. Conduction of V12 may be varied by the variable resistor in its cathode circuit to line 4. This is an individual horizontal position control and affects the position of the illuminated spot during the discharge of the condensers of the "units" order only.

A point is reached in the discharge of the selected keyboard condenser where triode V62 in the circuit between the "units" keyboard and the deflecting anode A2 of the cathode ray tube becomes non-conductive. Further condenser discharge causes no further horizontal deflection. Thus for the remaining period of vertical sweep the modulated horizontal beam maintains constant width.

When triode V62 cuts off, corresponding to that point where maximum horizontal sweep is reached, a circuit which detects such a condition turns on a trigger designated T4. The grid of V62 is connected via wire 17, wire 16 to the cathode of triode V74. The grid of V74 is fixed at a constant potential by connection via wire 19, wire 39 to the junction of R134, R136. When V62 becomes non-conductive due to the grid potential of V74 as established by the voltage divider R134, R136, V74 becomes conductive. The increased potential drop across R138 is applied through condenser C120 and causes T4 to switch on. When trigger T4 switches on its point 120 rises in potential. The grid of triode V76 is connected to the junction of voltage divider R140, R142 and is brought to zero bias. Conduction of V76 is effective via wire 8 and through R114 in bringing the grid of V22 below that of line 2. This circuit prevents charging of the "units" order keyboard condenser at the beginning of the "tens" order charging period. The grid 1 of pentode V78 is connected to the junction of voltage divider R180, R182 and when T4 switches on is brought to zero bias. No anode current flows in this circuit, however, due to cutoff potential existing on grid #3 of V78. Further operation in this circuit occurs later in the cycle.

When T4 switches on as the point of maximum horizontal deflection is reached, vertical deflection is not as yet at its terminal point. Condenser C106 in the vertical sweep generator continues to discharge until triode V58 reaches its cutoff point. At such point, vertical movement of the beam ceases and it is desired to cut off the beam current to extinguish the illuminated spot.

The beam is extinguished when cutoff potential exists on the grid of V58. V58 grid is connected via wire 22 to the grid of triode V98 used for decoupling. The cathode of V98 is connected to the cathode of pentode V52 whose grid is fixed at a constant potential by connection through R184 and wire 21 to the R126, R128 junction in the V58, V60 cathode return to line 3. The potential on wire 21 is such that when V58 reaches cutoff V52 conducts by cathode control from V98. The decreasing potential on wire 22 causes decreased current flow through V98 causing its point 125 to drop. The V52 cathode also connected to this point thus becomes less positive until finally conducting grid bias exists.

Conduction of V52 causes its anode potential to fall sharply. The decreased potential on its anode is applied through voltage divider R142, R144 junction to the #3 grid of V50. V50 is thus cut off and discharge of C108 ceases. There now being no C108 discharge current flow through R122, the cathode-grid #1 potentials are returned to a beam cutoff value.

Still further discharge of condenser C106 permits the potential of point 118 (cathode of V38) to drop to such a value that V38 becomes conductive. The resulting negative shift of V38 anode (point 128) is applied via wire 40, through C116 to the grid #1 of pentode V32. Thus V32 is cut off and its point 108 rises sharply. This determines the end of the first recording period in which the units digit was outlined on the cathode ray tube and recorded on film.

The operation of inscribing the illuminated area on the face of the cathode ray tube is initiated by simultaneously discharging the condensers C108, C106 and .9C associated with the pressed key in the units column of the keyboard. When condenser C108 begins to discharge an illuminating spot appears on the face of the ray at the A (see FIG. 5) which is the point of maximum horizontal and vertical deflection due to the potentials in the lines of the condensers C106, .9C, which lines are in circuit with the deflecting anodes A1 and A4 of the cathode ray tube. The potential in these lines is at its highest when these condensers commence to discharge and becomes lower as the discharge progresses. The potential on the deflecting anodes A2 and A3 is maintained constant so that the beam tends to move vertically upward and to the right as viewed in FIG. 5 due to the lowering potentials on anode deflecting anodes A1 and A4.

Due to the high frequency oscillator in the circuit of anode deflecting anode A2 the potential to this anode is intermittently applied and consequently the beam oscillates continuously in a horizontal path, the length of the path being limited by the deflection of the beam as determined by the fixed potential of deflecting A1 anode and the decreasing potential applied to deflecting anode A2. This decreasing potential causes the path of oscillation to increase in length until the circuit of discharging condenser .9C becomes non-conducting through the switchover of triode V22. At this point deflecting anode A2 is, through triode V62, connected to a circuit which is maintained at a constant potential and through the remainder of the recording cycle the path of oscillation is maintained constant.

Figure 5:
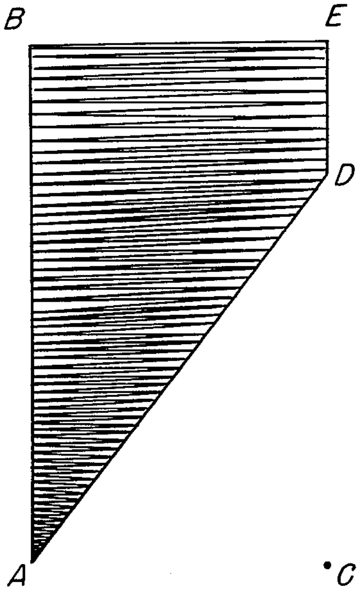
FIG. 5 is an enlarged diagram of the illuminated area representing the digit "1" showing the path of the illuminated spot on the face of the cathode ray tube in tracing the area.

FIG. 5 shows the path followed by the illuminated spot on the face of the cathode ray tube in displaying the character representing digit "1" as it is recorded on the film. The spot, when the beam is turned on, first appears at point A. This corresponds to the beginning of the image trace. The vertical deflection potentials produced in the circuit, were it not for any horizontal change, would cause the spot to move from point A to point B. Likewise, the horizontal deflection potentials produced in the absence of any vertical change would cause the spot to move from point A to point C. The resultant trace of the spot due to the combined changes occurring simultaneously herein would cause the spot to move in a path from point A to point D then to point E. An oscillator provided in the circuit modulates the horizontal deflection potentials and the lines AB, ADE represent the envelope of the modulated wave.

The frequency of oscillation is such with respect to the rate of vertical movement and the dimension of the illuminated spot that the successive paths of the luminous spot over-lap along the edges and thus produce a photographic image wherein the entire area traversed by the moving spot receives sufficient light to fully expose the light sensitive emulsion and produce in the developed film a transparent area of the desired size and shape.

The positive rise of point 108 is applied through condenser C120 to the grid of V80 and in a manner now understood again turns on trigger T2. When T2 turns on the positive rise of point 122 is applied via wire 23, then wire 24 through C122 to the #3 grid of pentode V78. This positive pulse overcomes the cutoff bias on the #3 grid and since the #1 grid of this tube is now at zero bias under control of T4, T5 of the "tens" circuit switches on. When T5 switches on the positive rise on the anode of the triode made non-conductive is applied through C134 to the grid of V82 and conduction of this triode switches off trigger T3 of the "units" circuit.

From the foregoing it is seen that the end of the "units" period was determined by the conduction of V38 near the end of the C106 condenser discharge. At such point "flyback" of the cathode ray spot occurred. V32 was momentarily cut off and in turn switched on T2. When T2 switched on it advanced the commutator which controls the horizontal position and unblocks the "tens" order charging circuit.

T2 in switching on prevents V32 from becoming conductive by holding its #3 grid at cutoff. A new charging period is now in effect and upon switching off of the self-restoring trigger T2 the tens digit will be displayed on the cathode ray tube screen and recorded in the film.

Further operation for this "tens" period is identical with that described for the "units" with one exception. When T2 switches off it also turns off trigger T4. Point 112 in T2 goes positive when T2 switches off and this point is connected via wire 26, then wire 29 through C124 to the grid of V92. Resulting conduction of V92 switches off T4.

Triggers T5 and T6 function in the "tens" recording cycle in the same manner as T3 and T4 in the "units" recording and triggers T7 and T8 function similarly in the recording of the "hundreds" order, except that as in the machine selected for illustration the "hundreds" order is the highest order of the recording cycle, trigger T8 controls certain additional operations. To increase the capacity of the machine to record a greater number of orders it is only necessary to enlarge the keyboard and provide for each added order triggers and other instrumentalities duplicating those provided for the intermediate "tens" order.

Upon completion of the "tens" period, at the "flyback" time, a third and in this case final period begins in which the "hundreds" digit is recorded. As this is the highest order for which the machine is designed, T8 has two additional functions, namely: to operate the release of the motor bar and key bar and to advance the film. Two voltage dividers are connected via wire 31 between point 124 in trigger T8 and line 4. The junction of the R148, R150 voltage divider is connected via wire 32 to the grid of triode V34. Thus when T8 switches on V34 is made conductive and prevents the already low point 108 from rising upon subsequent cutoff of pentode V32. Point 108 is caused by the conduction of V34 to shift from a point slightly higher than line 2 to a point a little below line 2. This has no effect. The other voltage divider R164, R166 junction is connected to the #3 grid of pentode V88. The #1 grid of V88 is connected via wire 35 to the R128, R130 junction in the common cathode return path of V58, V60. V88 cathode is connected via wire 34 to point 125 which decreases in potential along with the discharge of C106. By means of voltage divider R128, R130 the grid #1 potential of V88 is fixed such that it begins to conduct at the same time that V38 becomes conductive. The action of V38, when it conducts, at the end of this final recording period is lost since point 108 is held down by other means. Therefore, V88 is provided to determine the ending of this final period. V88 anode is connected via wires 27 and 26 to point 112 in T2. When V88 conducts it turns on self-restoring trigger T2.

When T2 switches on the positive rise of its junction 122 is applied via wire 23 through condenser C136 to the #3 grid of V102. Grid #1 of V102 is already zero biased under control of T8, now on. Thus when T2 switches on at the end of the "hundreds" recording period, the positive pulse then applied to the #3 grid of V102 switches T7 off. Point 126 goes positive when T7 switches off and this rise is applied via wire 25 through condenser C150 to the grid of V90. Conduction of V90 switches off T1. With T1 now off, V24 is again conductive and point 108 is held below line 2 when V34 is again made non-conductive.

When T1 switched off and its point 102 became more positive, this rise was applied via wire 36 to the grid of V100. V100 is a thyratron and the applied pulse caused it to fire. Conduction of V100 energizes solenoid coil 62 to release the latches for the motor bar and key bars in the keyboard (not shown). Contacts 202 in the circuit of coil 62 are closed when the motor bar is depressed and opened by its release. Another thyratron operated solenoid 63 is employed to advance the film one increment in preparation for the following entry cycle as will be later described. Wire 36 is also connected through C154 to the grid of thyratron V108 and is ignited when T1 switches off.

V108 self-extinguishes when the voltage across C152 falls below that required to maintain ionization. V108 remains extinguished due to the negative grid #1 bias and C152 again charges up to full line potential for subsequent operation of the film advance circuit. When T2 switches off its final operation is to switch off T8. Point V112 in T2 is connected via wire 26 through C154 to the grid of V110 and by the resulting momentary conduction of V110 switches off T8.

A condition may occur where the motor bar is latched down at the time power is supplied to the device. Operation of SW2 will not result in its release if T1 is already off. Release of the motor bar is then made possible by the momentary closure of SW1 contacts.

Figure 6:
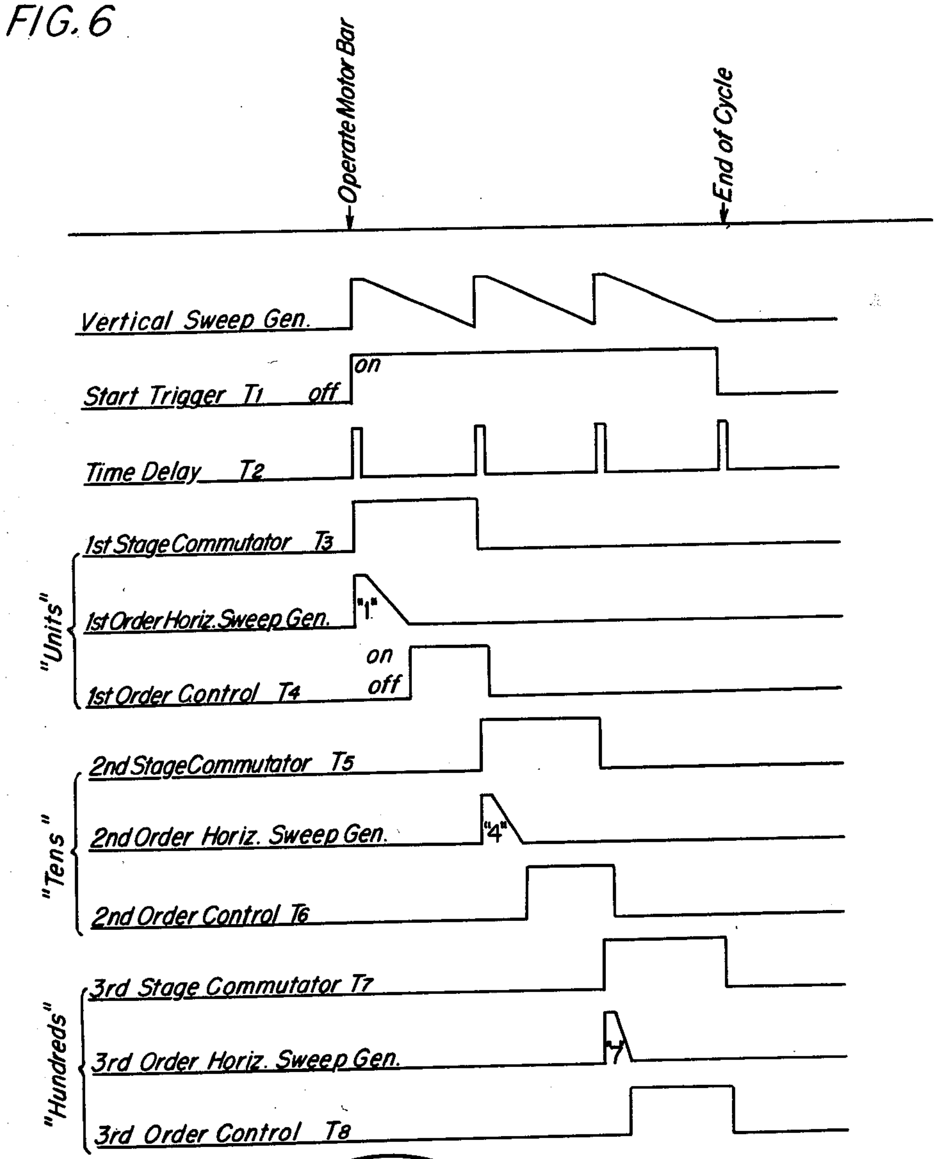
FIG. 6 is a timing chart showing the sequence of operations as carried out in producing a photographic record of the number 741.
Figure 2:
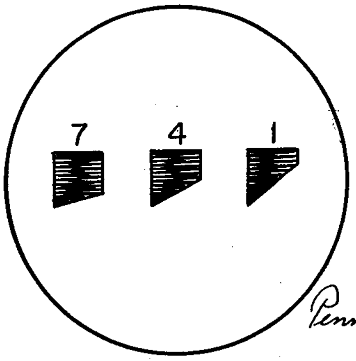
FIG. 2 shows the face of the cathode ray tube with the areas which are successively illuminated in recording the number 741 indicated thereon.
Figure 4:
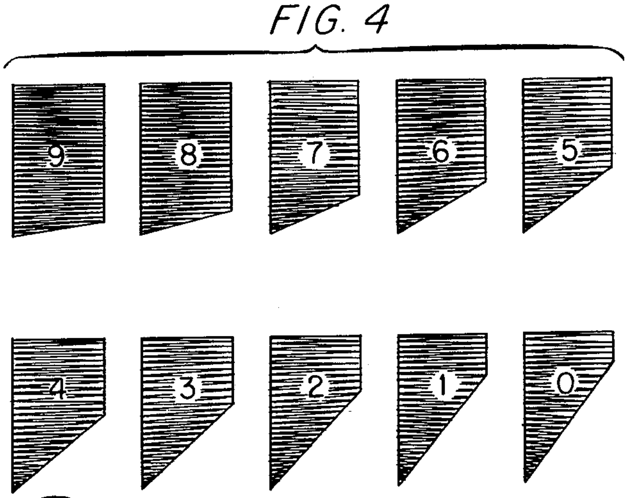
FIG. 4 shows the shape of the illuminated areas of all the ten digits.
Figure 3:
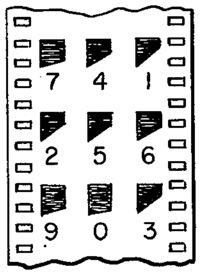
FIG. 3 shows on an enlarged scale a section of film containing the recorded number 741 and other numbers as they would appear on continued operation of the machine.

FIG. 6 is a timing chart which shows the relative condition of the various triggers during the entry cycle of "741." The length of the time delay effected by trigger T2 is exaggerated in this chart.

Advancing of the film in the camera mechanism is also made possible by the momentary operation of switch SW3 to the position other than that shown. By means of this switch SW3 the film may be advanced without making an entry.

Figure 7:
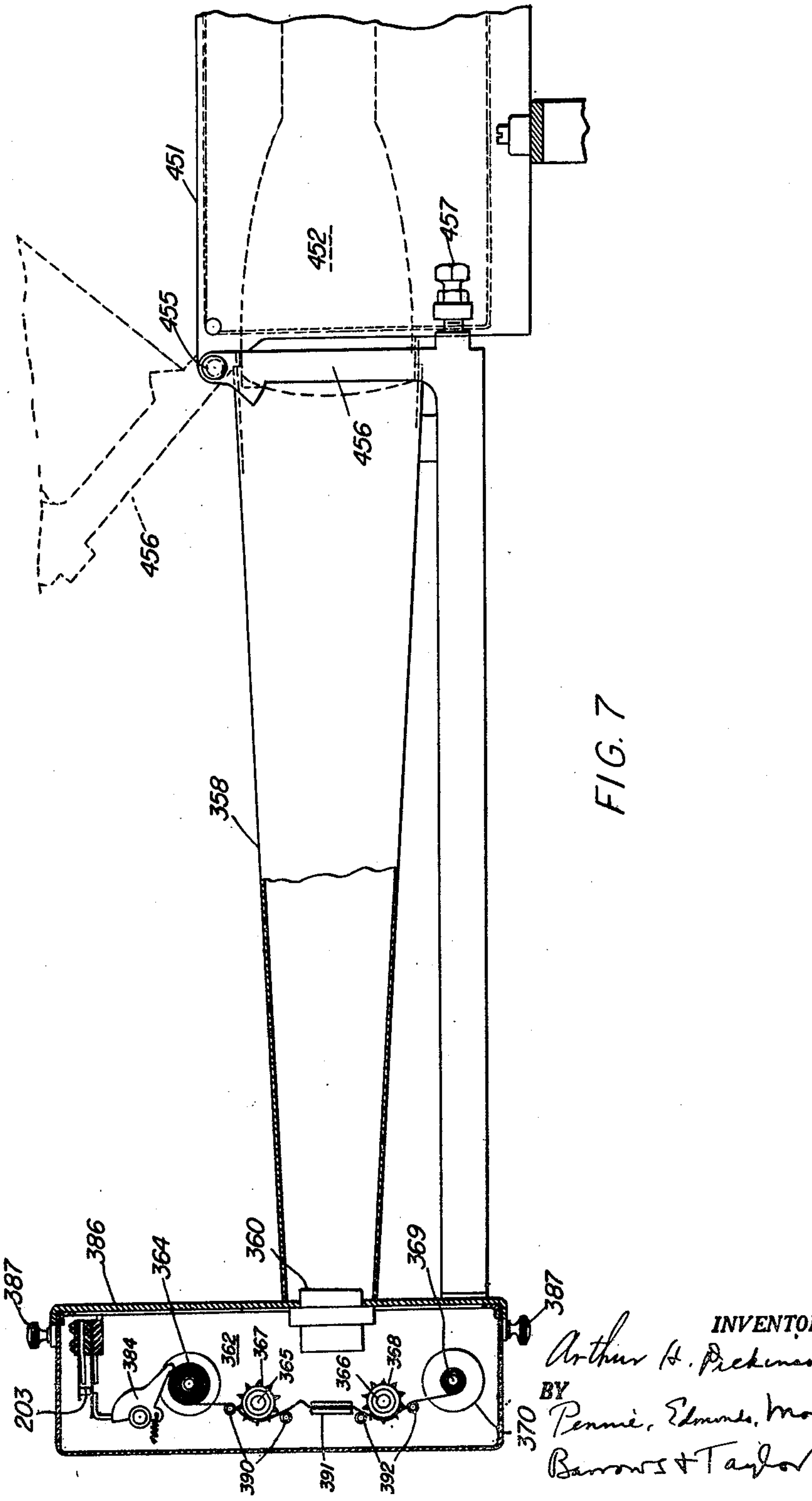
FIG. 7 is a vertical sectional view showing the mounting of the cathode ray tube and the attached camera.
Figure 8:
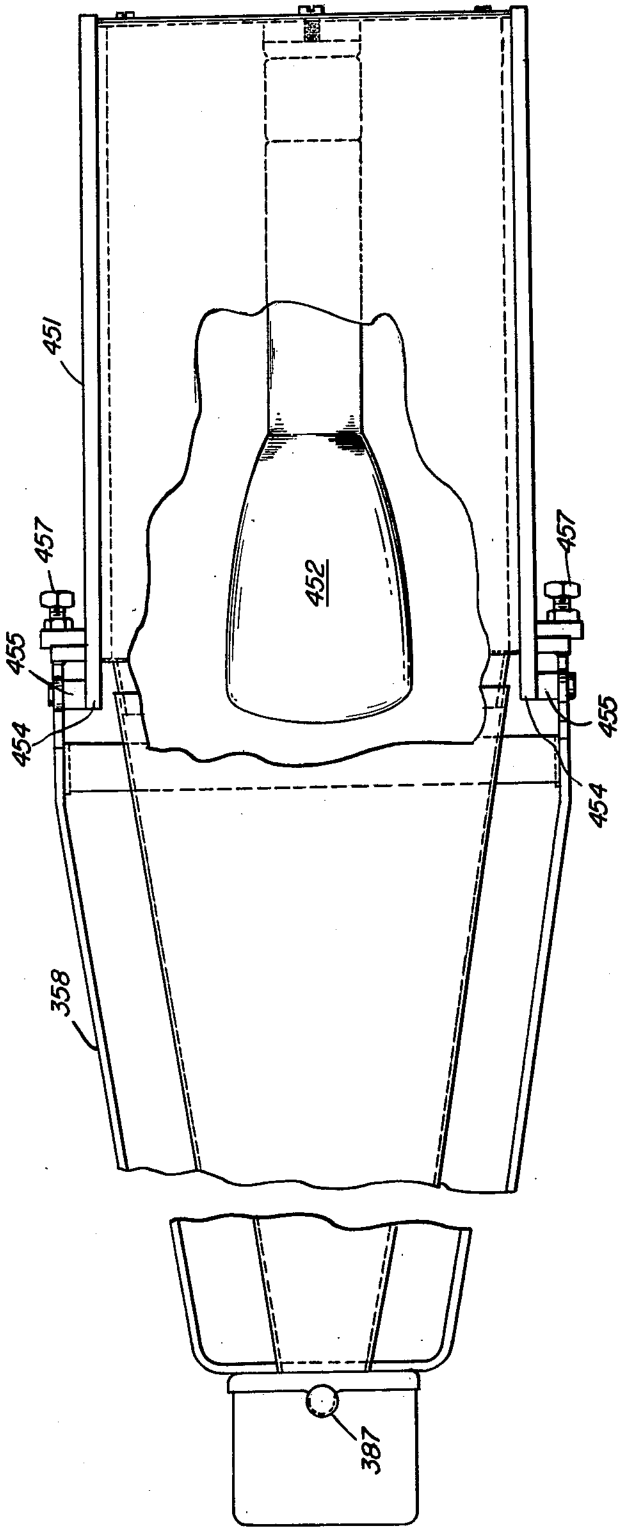
FIG. 8 is a plan view partly in section of FIG. 7.

For photographing the face of the cathode ray tube any suitable apparatus may be employed depending upon the type of record required. In any case the speed of the evolution should be fast enough to be fully exposed during the instant of illumination and the mechanism for feeding and positioning the light sensitive medium should be accurate and positive. A suitable photographic recording mechanism is shown in FIGS. 7 to 11, inclusive. Referring to FIG. 7 a light tight funnel 358 extends from the face of the cathode ray tube 357 to the back plate 359 of the camera unit. This back plate 359 carries a suitable lens assembly designated 360.

Within the camera device and fixed to the back plate 359 (see FIG. 10) is an assembly plate 362. A stud 363 carried by plate 362 affords a support for a film supply spool 364. A pair of shafts 365 and 366 (FIG. 7) are also rotatably supported by the assembly plate 362 and on these shafts are film feed sprockets 367 and 368. Another shaft 369 affords a support for a takeup spool 370.

Figure 9:
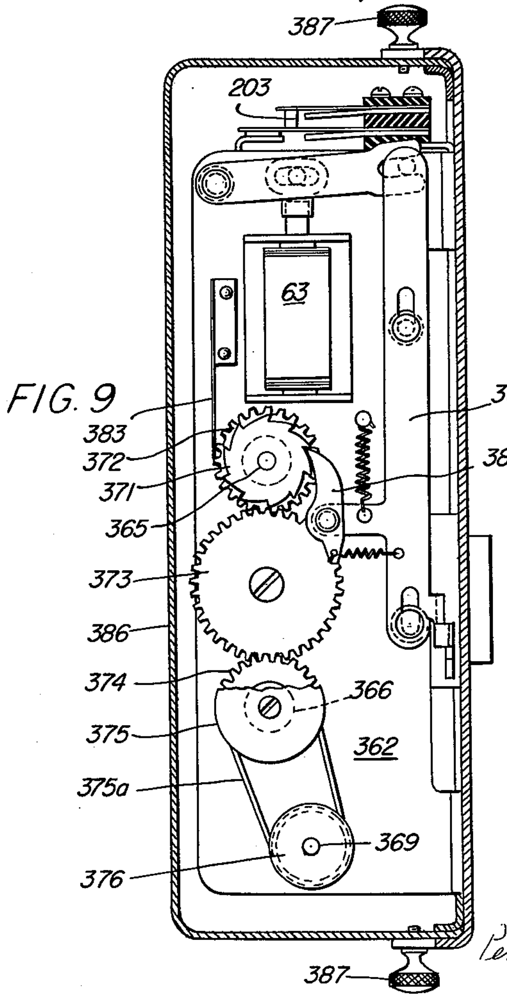
FIGS. 9 and 10 are sectional views of the camera showing the film feeding mechanism.
Figures 10, 11:
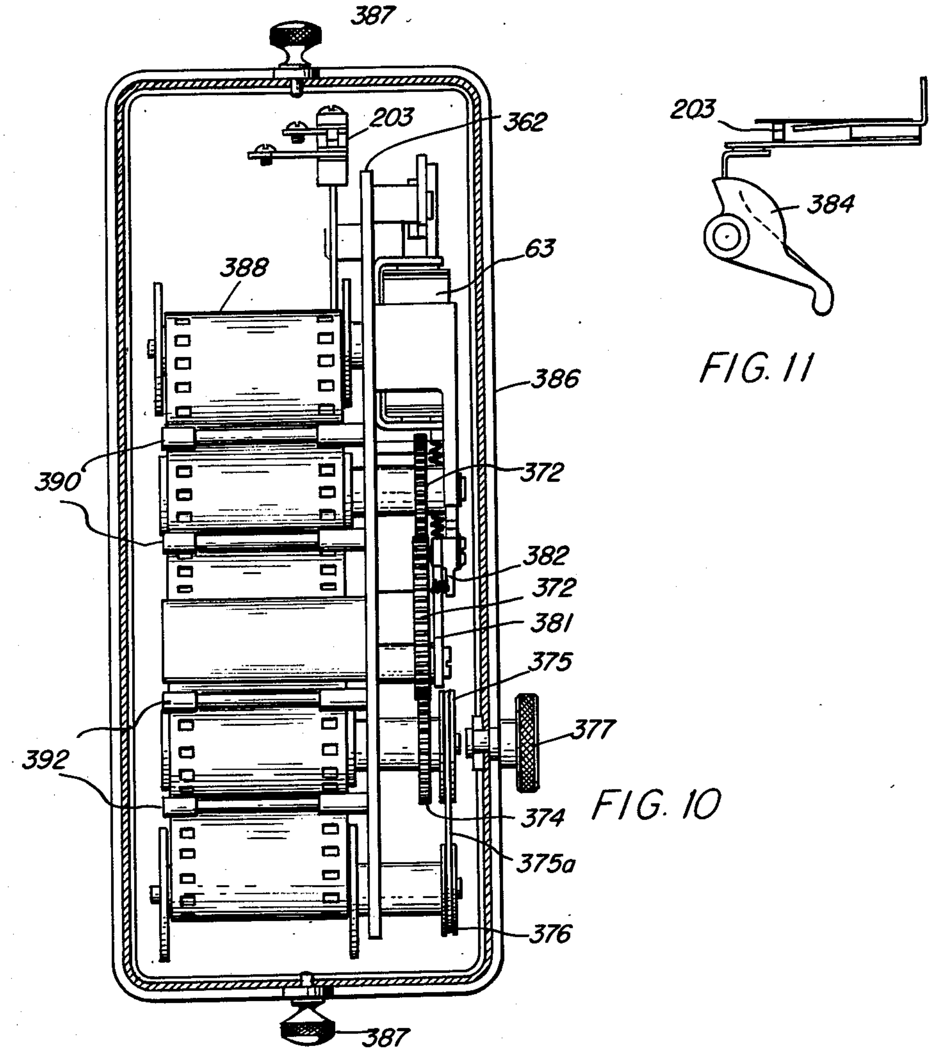
FIG. 11 is a detail view of the cut-out switch for the film feed solenoid.

Referring now to FIG. 9, shaft 365 has fastened to it a ratchet 371 and a driving gear 372. Driving gear 372 meshes with an intermediate gear 373 which in turn is meshed with a gear 374 fixed on shaft 366. A belt 375*a* transmits motion from a pulley 375 fixed to shaft 366, to a pulley 376 on takeup spool shaft 369. Shaft 366 is slotted at one end to receive a winding key generally designated 377, normally in the retracted position as shown in FIG. 10. Also carried by the assembly plate 362 is a film feed solenoid 63, energization of which will depress an actuating member 381. This member 381 is suitably spring-restored to the upper position and upon restoring movement, a pawl 382, carried by the member, actuates the film feed ratchet 371 to advance the film one line space. A flat spring 383 serves as a detent for the ratchet 371.

Referring again to FIG. 7, within the camera housing there is provided a pivoted lever 384 which is spring pressed into contact with the film on the supply roll. When the film is exhausted the member 384 swings clockwise to such an extent that a pair of contacts 203 opens. At other times with film available on the supply spool, the lever 384 maintains these contacts closed.

The camera unit is provided with a suitable housing or cover designated 386. This cover is held in position by a pair of knurled thumb screws 387. The film 388 is provided with the usual feeding sprocket holes. The film passes successively under the first two film guides 390 through a film gate 391 (see FIG. 7), and then under another pair of film guides 392 (FIG. 10). The film guides 390 and 392 and the film gate 391 are suitably mounted on the assembly plate 362.

Referring to FIG. 7, within the enclosed housing 451 is the cathode ray tube generally designated 452. On the screen of this tube appears the illuminated trace of the image to be recorded on the film in the camera mechanism. The side frames of the enclosure 451 are provided with forwardly extending lugs 454 receiving studs 455 which pivotally support a yoke in the form of a U-shaped bracket 456. See also FIG. 8. The yoke normally assumes the full line position shown in FIG. 7 in which position adjustment screws 457 abut the frame 456. When it is desired to view the face of the cathode ray tube the yoke or bracket 456 is swung to the dotted line position so that the image may be visually inspected on the face of the cathode ray tube for adjustment purposes.

In the foregoing specification I have disclosed in detail an apparatus for rapidly and with great precision producing on photographic films successive rows of images representing different digital values and of such different or related shapes as to produce when sensed by a light-responsive pick-up mechanism different electrical responses varying in accordance with the values of the digits represented. It is to be understood, however, that the invention is not limited to the embodiments thereof herein shown and described, but covers all such modifications as fall within the scope of the appended claims.

I claim:

1. In an apparatus for producing a row of light-responsive images representative of different values on a light-sensitive medium, a cathode ray tube, means for supporting a light-sensitive medium in position to be exposed by the light of said tube and means for selectively modifying the migration of the cathode ray beam to produce latent images in said medium having portions of uniform width and portions of progressively varying width and modifying the rate of change in the width of said last named portions in accordance with the difference in values represented by said images, and means for shifting the position of the cathode ray beam at the conclusion of the exposure of the first image to a second starting point laterally displaced from the first starting point and thereafter controlling its migrations to produce an image modified in accordance with a second selected value.

2. In an apparatus for photographically producing a row of light-responsive images representative of different values, a cathode ray tube having vertical and transverse deflecting anodes, a circuit for each image position, a series of condensers for each circuit, said condensers being of different capacities varying in accordance with the different values to be represented, means for selectively connecting said condensers to said circuits, means for successively connecting said circuits to one of the deflecting anodes of said cathode ray tube during the discharge of said condenser to thereby selectively modify the migration of the cathode ray beam in one direction, and means for maintaining a uniform migration of said beam in the transverse direction during the discharge of said condensers.

3. In an apparatus for producing a row of light-responsive images representative of different values on a light-sensitive film, a cathode ray tube, means for supporting a light-sensitive film in position to be exposed by the light of said tube and means for selectively modifying the migration of the cathode ray beam to produce different latent images in said film, means for shifting the position of the cathode ray beam at the conclusion of the exposure of the said image to a new starting point laterally displaced from the first starting point and thereafter controlling its migrations to produce an image modified in accordance with another selected value, and means for advancing said film a distance to bring an unexposed area into position to be exposed by the light from said tube at the conclusion of exposure of the first row of images and repositioning the cathode ray beam to its initial position for recording the first image of a succeeding row.

References Cited in the file of this patent

UNITED STATES PATENTS

| | | |
|---|---|---|
| 1,951,036 | Parker | Mar. 13, 1934 |
| 2,078,285 | Schrader | Apr. 27, 1937 |
| 2,292,045 | Barnett | Aug. 4, 1942 |
| 2,449,792 | Snyder | Sept. 21, 1948 |
| 2,455,373 | Lester | Dec. 7, 1948 |
| 2,525,891 | Garman | Oct. 17, 1950 |
| 2,563,967 | Sherwin | Aug. 14, 1951 |
| 2,591,919 | Collard | Apr. 8, 1952 |
| 2,596,741 | Tyler | May 13, 1952 |
| 2,699,498 | Guenther | Jan. 11, 1955 |